United States Patent Office 2,920,861
Patented Jan. 12, 1960

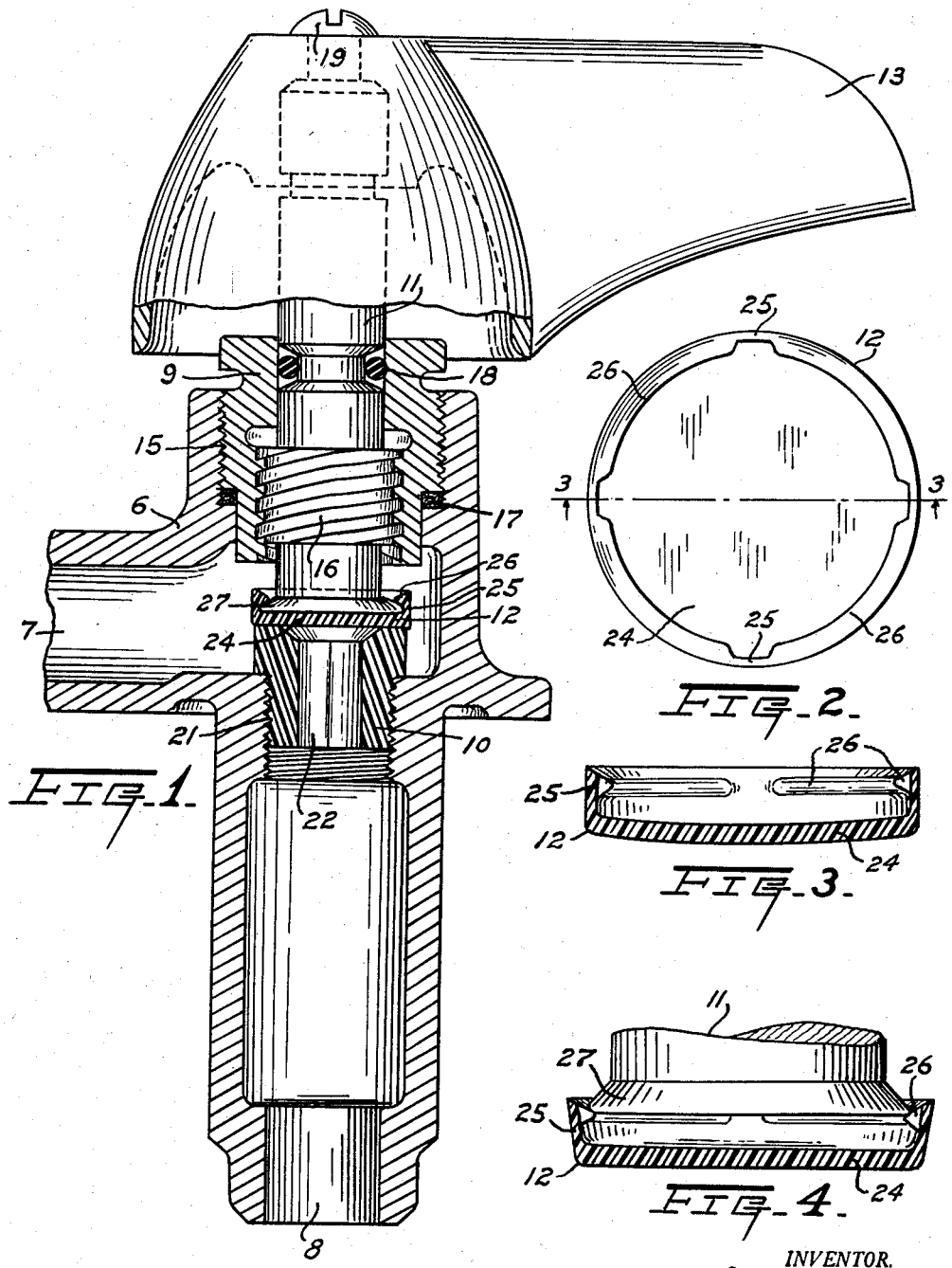

2,920,861

FAUCET VALVE ASSEMBLAGE

Gilbert L. Hartmann, Whitefish Bay, Wis., assignor to Milwaukee Faucets, Inc., Milwaukee, Wis., a corporation of Wisconsin Application July 25, 1956, Serial No. 600,108

2 Claims. (Cl. 251—357)

The present invention relates in general to improvements in valves, and more specifically to improvements in the construction and operation of fluid valve assemblages adapted for diverse uses.

The primary object of my invention is to provide an improved valve assemblage which is simple and durable in construction, and highly effective in use.

Faucets for household and industrial usage adapted to control the flow of water and other liquids from sources of supply through delivery spouts, have long been formed of non-corrosive metal and provided with various types of special movable valve disks adapted to sealingly coact with stationary seats so that at least the disks could be periodically replaced. In most cases, these prior faucet valve seats have ordinarily been formed of metal either integral with or detachable from the valve bodies, while the valve disks were removable and made of rubber composition being attached to the ends of the axially movable faucet actuating spindles by screws passing centrally through the disks.

While these prior faucet assemblages functioned quite satisfactorily for a short time after new valve seats and disks were installed, the disks would soon become deformed especially when subjected to high temperatures and to repeated excessive closing pressure, and would therefore introduce objectionable leakage thus requiring frequent renewal of the disks. Then too, the metal seats of these prior faucets would often become excessively worn and corroded due to the presence of impurities in the liquid, thereby also causing considerable leakage and necessitating refinishing or replacement of the seats.

In an effort to obviate these prior difficulties, it has heretofore been proposed to form these faucet seats and disks of moulded plastic material such as "nylon" capable of withstanding high temperatures and pressures for long periods of time without deformation or deterioration. Since the seats of these faucets are fixed, the provision of plastic valve seating plugs attached by screw threads to the valve bodies, presents no special problem, but due to the limited space normally available within such faucets, it is far more difficult to properly attach such plastic valve disks to the spindles, especially without utilizing attaching screws or the like which are liable to become detached.

It is therefore an important object of the present invention to provide an improved faucet embodying plastic sealing elements adapted to be readily produced and attached without the use of separate fasteners.

Another important object of this invention is to provide an improved valve assemblage wherein a resilient plastic valve disk may be firmly attached to a carrying spindle without utilizing separate fasteners.

A further important object of the invention is to provide a simple and conveniently attachable valve disk for faucets or the like, adapted to be snapped onto its supporting member and to effectively cooperate with diverse types of valve seats for long periods without requiring replacement.

Still another important object of my invention is to provide an improved faucet assemblage in which valve seats and disks formed of resilient moulded plastic such as "nylon" are caused to cooperate in a most effective manner and for extensive duration.

An additional important object of the present invention is to provide a relatively inexpensive but highly efficient valve seat and disk assembly especially applicable to water faucets or the like, and wherein the sealing elements are not subject to corrosion or deterioration due to excessive temperature or applied pressure, or to the presence of normal impurities in the liquid.

These and other more specific objects and advantages of the invention will be apparent from the following detailed description.

A clear conception of the features constituting the present improvement and of the construction and functioning of a typical faucet assemblage embodying the invention, may be had by referring to the drawing accompanying and forming a part of this specification wherein like reference characters designate the same or similar parts in the various views.

Fig. 1 is a central vertical section through a typical commercial faucet embodying resilient plastic sealing elements, drawn to an enlarged scale;

Fig. 2 is a further enlarged top view of one of the improved resilient plastic valve disks embodying the present improvements;

Fig. 3 is a similarly enlarged central section through the plastic disk of Fig. 2, taken along the line 3—3 and illustrating the shape of the disk before being attached to its carrying spindle; and Fig. 4 is a likewise enlarged and central section through the same valve disk, showing the manner in which the resilient disk is distorted while being fastened to its supporting spindle.

While the invention has been shown and described herein as having been applied to a particular type of faucet valve and embodying both a plastic seat and valve disk coacting therewith, it is not the intent to limit the improved features to such an assemblage since at least some of these features are more generally applicable to other types of valves; and it is also contemplated that specific descriptive terms employed herein be given the broadest possible interpretation consistent with the actual disclosure.

Referring to the drawing, the improved faucet shown in Fig. 1, comprises in general, a valve casing or body 6 having therein a liquid discharge passage 7 communicable with a supply conduit 8, and being provided with a removable bushing 9 disposed in axial alinement with the conduit 8; a valve seat 10 secured within the body 6 at the junction of the discharge passage 7 and supply conduit 8; a valve actuating stem or spindle 11 axially movably confined within the bushing 9 and projecting inwardly and outwardly therefrom; a valve disk 12 secured to the inner end of the spindle 11 and being sealingly cooperable with the valve seat 10; and a manipulating handle 13 secured to the outer end of the spindle 11.

The valve body 6 may be cast from corrosion-resisting metal, and the bushing 9 may be formed of similar metal and is detachably secured to the body 6 by means of external screw threads 15 while the bushing interior is bored to snugly engage the spindle 11 and is also provided with internal quick-pitch screw threads 16 coacting with similar threads formed on the medial portion of the spindle. An annular packing 17 is confined between the bushing 9 and the body 6 inwardly of the ends of the screw threads 15, and an O-ring packing 18 is also interposed between the bushing bore and an annular groove in the spindle 11 outwardly beyond the screw threads 16 and cooperates with the seat 10 and disk 12 to seal the body 6 against leakage when the valve has been installed. The manipulating handle 13 for rotating the spindle 11 in opposite directions may be of any desired shape, and is detachably secured to the outer spindle end by a screw 19.

The valve seat 10 is preferably formed of heat and wear resistant plastic such as "nylon," and has external screw threads 21 coacting with similar internal screw threads formed in the body 6 at the junction of the passage 7 and conduit 8. The interior of the plastic seat 10 has a through opening 22 communicating with the supply conduit 8, and this opening 22 may have square or otherwise polygonal transverse cross-section in order to facilitate rotation of the seat while attaching it to or removing it from the body 6 with the aid of the screw threads 21. The surface of the seat 10 which is exposed to the liquid discharge passage 7 is annular and flat but may merge into the opening 22 along a tapered annular surface, as depicted in Fig. 1.

The valve disk 12 shown in all views is of special improved construction, preferably being formed of resilient moulded plastic such as "nylon" and having a relatively flat base 24 formed integral with a resilient wall 25 provided at its free edge with several inwardly directed flanges 26. As shown, the valve disk 12 is of unitary construction and cup-shaped, the local flanges 26 being segmental and formed integral with the interior of the flexible brim wall of the cup. These disks 12 must be very accurately produced with the internal diameter of the segmental flanges 26 slightly less than the external diameter of an annular outwardly projecting ledge 27 formed on the adjacent inner end of the spindle 11, and the outer surfaces of the flanges are preferably inclined toward the base 24 which is slightly dished as shown in Fig. 3 before the disk 12 is attached to a spindle 11.

When the various parts of the improved faucet have been properly constructed as hereinabove described, the valve seat 10 may be readily installed within the body 6 while the bushing 9 and valve stem or spindle 11 are removed, and the stem after being provided with an O-ring 18 may be readily applied within the bushing 9 before the handle 13 is attached, in an obvious manner. A plastic valve disk 12 such as shown in Figs. 2 and 3 may then be positioned upon a flat support, whereupon the ledge 27 of the spindle 11 should be forcibly applied to the segmental flanges 26 as in Fig. 4, thereby bending the resilient cup wall 25 outwardly. As the force applied to the spindle 11 continues, the ledge 27 will pass the inner edges of the flanges 26 whereupon the resiliency of the wall 25 augmented by the dished base 24 of the disk 12 will cause the wall 25 to return to normal position and to snap the flanges 26 over the ledge 27 as illustrated in Fig. 1.

The valve disk 12 will then be firmly attached to the spindle end and the base 24 will lie flat against the end surface of the spindle 11. With the valve disk 12 thus fastened to the spindle 11, and the latter assembled within the bushing 9, the faucet may be finally completely assembled with a packing ring 17 in place and a handle 13 attached to the stem by a screw 19 as in Fig. 1. The handle 13 may thereafter be manipulated to cause the quick pitch screw threads 16 to move the valve disk 12 toward the fixed seat 10 to close the valve, or away from this seat 10 to connect the passage 7 with the conduit 8 through the opening 22, and the resilient plastic valve 12 and seat 10 provide durable cooperating elements which insure tight sealing of the liquid ducts and quick opening thereof.

From the foregoing detailed description it will be apparent that the present invention in fact provides an improved faucet valve assemblage which is simple and compact in structure and is also devoid of valve seat and disk attaching elements which might become detached. The plastic seats 10 and cooperating disks 12 can be very accurately formed by moulding, and are adapted to cooperate without danger of adhering to each other due to corrosion; and these sealing elements can also be produced at moderate cost and easily installed or replaced. The improved formation of the cup-shaped plastic valve disks 12 is especially important in order to insure convenient and firm attachment of these disks to the spindles 11, and it has been found that these resilient plastic disks 12 outlast the rubber valve disks formerly used in such faucets, by many operations, and do not deform so as to obstruct free flow of the liquid as with these previous disks.

The segmental construction of the disk flanges 26 vastly reduces the axial force which must be applied to the spindle 11 in order to push the annular spindle ledge 27 past these flanges 26; and the hard but resilient "nylon" plastic of which the disk 12 is formed allows the relatively thin portions of the cup brim or wall 25 disposed between the adjacent ends of the successive flanges 26 to stretch slightly and thus permits the flanged portions of this wall 25 to bend outwardly while the axial pressure is being applied to the spindle 11. The force thus required to assemble the plastic disk 12 upon the spindle 11 is also minimized by the inclined formation of the segmental flanges 26 which assist in momentarily spreading the cup wall 25 as in Fig. 4, but when the ledge 27 of the spindle 11 has passed the inner edges of the flanges 26 the stiff but resilient continuous wall forces these flanges over the spindle end ledge 27 with a snap action and locks the disk 12 to the spindle 11, as in Fig. 1.

The use of the resilient O-ring 18 for packing the valve stem 11 beyond the screw threads 16 also cooperates with the valve disk 12 and seat 10 to prevent escape of liquid from within the casing 6 when the valve is in use, and this O-ring may be easily installed and replaced. While the invention has been illustrated and described herein as being advantageously applicable to ordinary faucets, it may obviously more generally be applied to different types of valves.

It should be understood that it is not desired to limit this invention to the exact details of construction and operation of the faucet valve assemblage herein specifically shown and described, for various modifications within the scope of the appended claims may occur to persons skilled in the art.

I claim:

1. A faucet valve assemblage comprising, a hollow body having therein a fluid supply conduit, an annular valve seat secured within said body and having a through opening communicating with said conduit, a spindle movable axially toward and away from said seat and having thereon an annular continuous outwardly projecting end ledge adjacent to the seat, and a unitary cup-shaped valve disk of hard plastic having a flat base sealingly cooperable with said seat and a continuous annular resilient brim projecting away from the base and snugly embracing said spindle ledge, said brim being provided with an annular series of integral inwardly extending circumferentially segregated flanges separated from each other by thin resilient and stretchable brim portions and said flanges having inwardly inclined outer surfaces with which the periphery of said ledge is cooperable to spread and circumferentially stretch said thin brim portions sufficiently to cause the ledge to enter the stretched cup brim with a snap action when the spindle ledge is forced axially of the spindle past the flanges and into the cup.

2. An article of manufacture comprising, a cup-shaped valve disk of hard plastic having a relatively thick flat base and an integral continuous annular brim projecting away from the periphery of the base, said brim being provided with an annular series of integral circumferentially segregated inwardly extending flanges at its free edge remote from the base and said flanges being endwise separated by their resilient and stretchable resilient brim portions of less thickness than said base, each flange having an inwardly inclined outer surface for effecting circumferential stretching of said brim portions and outward spreading of the continuous brim by application of pressure against the surfaces axially of the cup.

References Cited in the file of this patent

UNITED STATES PATENTS

| | | |
|---|---|---|
| 1,430,685 | Sampson | Oct. 3, 1922 |
| 2,194,960 | Walker | Mar. 26, 1940 |
| 2,397,269 | Kelly | Mar. 26, 1946 |

FOREIGN PATENTS

| | | |
|---|---|---|
| 23,833 | Great Britain | Dec. 11, 1893 |
| 536,897 | Great Britain | May 30, 1941 |
| 536,906 | Great Britain | of 1941 |
| 123,121 | Australia | Oct. 24, 1944 |
| 78,366 | Netherlands | June 15, 1955 |